(12) United States Patent
Halivaara et al.

(10) Patent No.: US 9,386,412 B2
(45) Date of Patent: **\*Jul. 5, 2016**

(54) EVENT-BASED ASSISTANCE DATA DELIVERY

(71) Applicant: Nokia Corporation, Espoo (FI)

(72) Inventors: Ismo Halivaara, Tampere (FI); Lauri Wirola, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/684,784

(22) Filed: Apr. 13, 2015

(65) Prior Publication Data

US 2015/0223020 A1    Aug. 6, 2015

Related U.S. Application Data

(63) Continuation of application No. 12/164,514, filed on Jun. 30, 2008, now Pat. No. 9,026,095.

(51) Int. Cl.
| | |
|---|---|
| *G01S 19/05* | (2010.01) |
| *H04W 4/02* | (2009.01) |
| *G01S 19/07* | (2010.01) |
| *H04W 72/04* | (2009.01) |

(52) U.S. Cl.
CPC ............... *H04W 4/02* (2013.01); *G01S 19/05* (2013.01); *G01S 19/07* (2013.01); *H04W 72/044* (2013.01)

(58) Field of Classification Search
CPC ...... H04W 4/02; H04W 72/044; G01S 19/05; G01S 19/07
See application file for complete search history.

(56) References Cited

U.S. PATENT DOCUMENTS

| | | | |
|---|---|---|---|
| 7,269,411 B2* | 9/2007 | Corman | H04L 67/34 455/414.1 |
| 7,392,056 B2* | 6/2008 | Corson | H04W 68/00 455/410 |
| 2004/0068364 A1* | 4/2004 | Zhao | G01C 21/3492 701/468 |
| 2005/0059393 A1* | 3/2005 | Knowles | H04L 67/24 455/432.3 |
| 2007/0275733 A1* | 11/2007 | Vismons | G01C 21/26 455/456.3 |
| 2008/0018527 A1 | 1/2008 | LaMance et al. | |
| 2008/0096527 A1 | 4/2008 | Lamba et al. | |

FOREIGN PATENT DOCUMENTS

| | | | | |
|---|---|---|---|---|
| EP | 1783509 A1 | 5/2007 | | |
| FR | WO 2007054493 A1 * | 5/2007 | ............. | G01S 19/05 |
| WO | 0223216 A1 | 3/2002 | | |

(Continued)

OTHER PUBLICATIONS

International Search Report and Written Opinion for PCT/FI2009/050554 dated Oct. 13, 2009.

(Continued)

*Primary Examiner* — Mehmood B Khan
(74) *Attorney, Agent, or Firm* — Banner & Witcoff, Ltd.

(57) ABSTRACT

A method and system which may determine when to deliver assistance data to a requesting user device. In one example, the user device may request updates of assistance data related to one or more data type from an assistance server. Additionally, the user device may include one or more parameters for the delivery of updates of assistance data. The assistance server may provide updated assistance data based on an event and in compliance with the one or more parameters.

20 Claims, 5 Drawing Sheets

(56) References Cited

FOREIGN PATENT DOCUMENTS

| | | |
|---|---|---|
| WO | 2006134414 A1 | 12/2006 |
| WO | 2007054493 A1 | 5/2007 |
| WO | 2008025150 A1 | 3/2008 |

OTHER PUBLICATIONS

Non-Final Rejection in KR 10-2011-7001276 dated Mar. 19, 2012, with English translation.

Final Rejection in KR 10-2011-7001276 dated Aug. 16, 2012, with English translation.

Extended European Search Report and Written Opinion dated Jun. 4, 2014 in Application No. 09772616.0.

Notification of Defects in Patent Application dated Nov. 27, 2014 in Israel Patent Application No. 210380 and English translation thereof.

Jan. 30, 2015 (VN) Results of Substantive Examinaton—App No. 1-2010-03532.

* cited by examiner

US 9,386,412 B2

EVENT-BASED ASSISTANCE DATA DELIVERY

CROSS-REFERENCE TO RELATED APPLICATIONS

This application is a continuation of co-pending U.S. application Ser. No. 12/164,514, filed Jun. 20, 2008, and entitled "DELIVERY OF ASSISTANCE DATA FOR SIGNAL RECEPTION," which is incorporated herein by reference in its entirety.

BACKGROUND

One of the most well known global navigation satellite systems (GNSS's) is the Global Positioning System (GPS). Other GNSS include, for example, the GLObal NAvigation Satellite System (GLONASS) and the European Galileo positioning system (Galileo). A GNSS may be used in conjunction with a user device (e.g., a standalone GNSS device or a GNSS-enabled mobile communication device) to achieve one of a plurality of functions. For example, such a device may assist a user in navigating roads that the user may not be familiar with to reach the user's destination. Upon user entry of a desired destination, the device may use information received from one or more GNSSs among other information received and/or stored in the device to determine the exact location of the device and may further determine a route that will assist the user to reach the desired destination. In another example, the GNSS may be used in conjunction with the user device to determine a user's location or to provide the user with a map surrounding the user's location.

While traditional stand-alone navigation devices still exist, technology now allows user navigation devices to be a part of a mobile communication device such as a cellular phone or a personal data assistant (PDA). Such navigation devices may receive assistance data from a server, in addition to signals from the various satellites of the various GNSSs. Assistance data may allow the user navigation device to gain certain advantages, such as detecting GNSS signals quicker than without the assistance data and detecting weaker signals. While mere sending of assistance data from a server to a user navigation device is already possible, current methods are not optimal.

BRIEF SUMMARY

This summary is provided to introduce a selection of concepts in a simplified form that are further described in the Detailed Description. The summary is not intended to identify key features or essential features of the claimed subject matter, nor is it intended to limit the scope of the claimed subject matter.

In one aspect, a mobile communication device may initialize a session with a server by sending the server a request for assistance data. The request for assistance data may include parameters such as a delivery validity period and minimum and/or maximum data update rates. If a triggering event occurs, the server may send the terminal device information in accordance with the request parameters.

In another aspect, a server may receive requests for assistance data from two or more mobile communication devices. The server may group the devices based on the data type and parameters of the request as sent by the devices. The server may deliver assistance data to the various groups in accordance with the common request data types and parameters.

DETAILED DESCRIPTION

Figure 1:
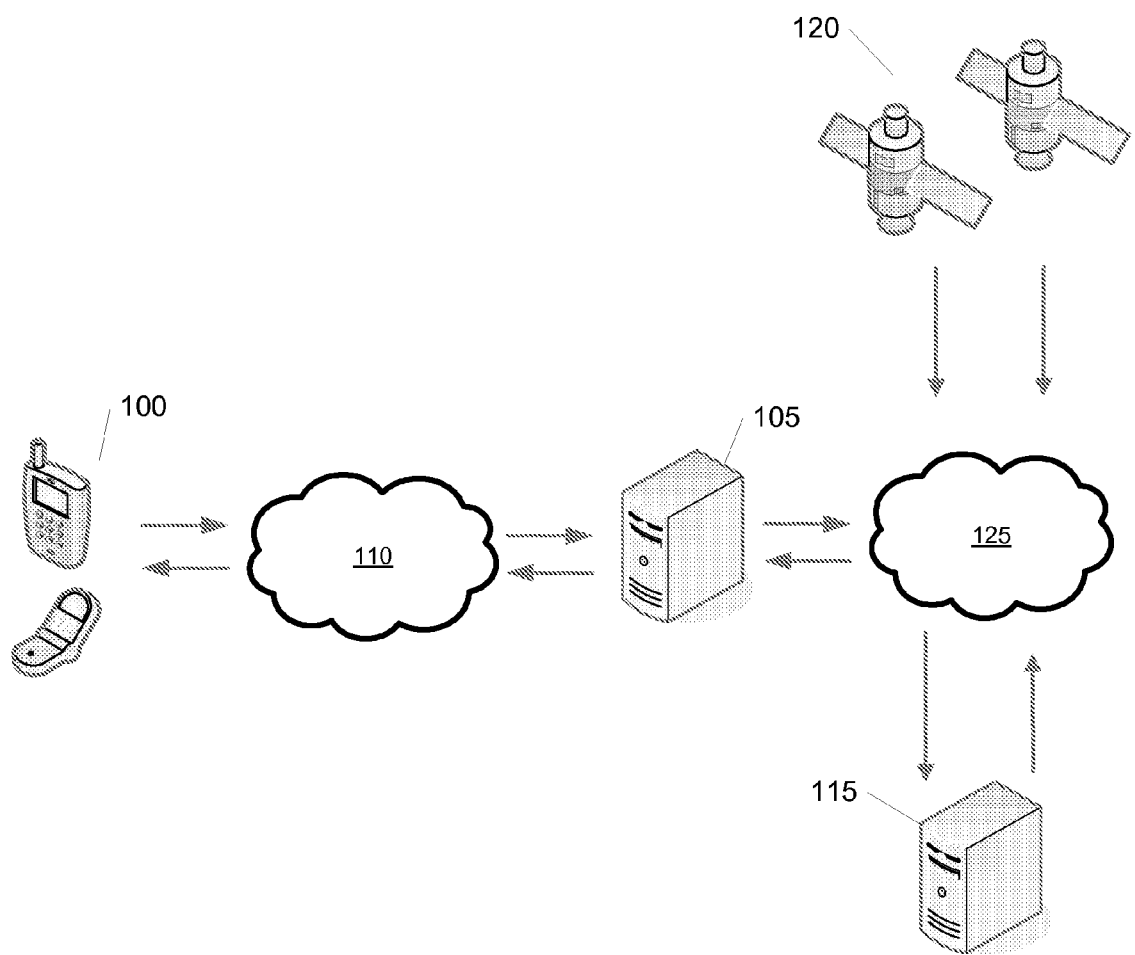
FIG. 1 illustrates a network environment in accordance with one or more aspects.

FIG. 1 illustrates a network environment in accordance with one or more aspects. Mobile communication device 100 may send an assistance data request to an assistance server 105 and may receive assistance data in response to the request from assistance server 105 via communication network 110. Assistance data may be any data that instructs a mobile communication device on where to look for the GNSS signals or any data related thereto. The delivery of such assistance data may be built on top of cellular system-specific control plane protocols including, for example, the radio resource location services protocol (RRLP) for GSM networks and the radio resource control protocol (RRC) as part of the RRC layer of layer 3 in a wideband code division multiple access network (WCDMA). The Secure User Plane Location (SUPL), standards-based protocol may be employed as a complement or an alternative to the existing standards based on the mobile network control planes and may allow the mobile communication device 100 to communicate with the assistance server 105 such that the mobile communication device 100 may be able to receive assistance data from the assistance server 105. Assistance server 105 may receive assistance data from one or more of a plurality of locations. For example, assistance server 105 may communicate with other assistance servers 115 and/or receive assistance from satellites 120 within one or more GNSSs via communication network 125. In one aspect, communication network 110 and 125 may be the same network. Those skilled in the art will appreciate these and other techniques for allowing communication and assistance data transfers between mobile communication device 100 and assistance server 105.

Figure 2:
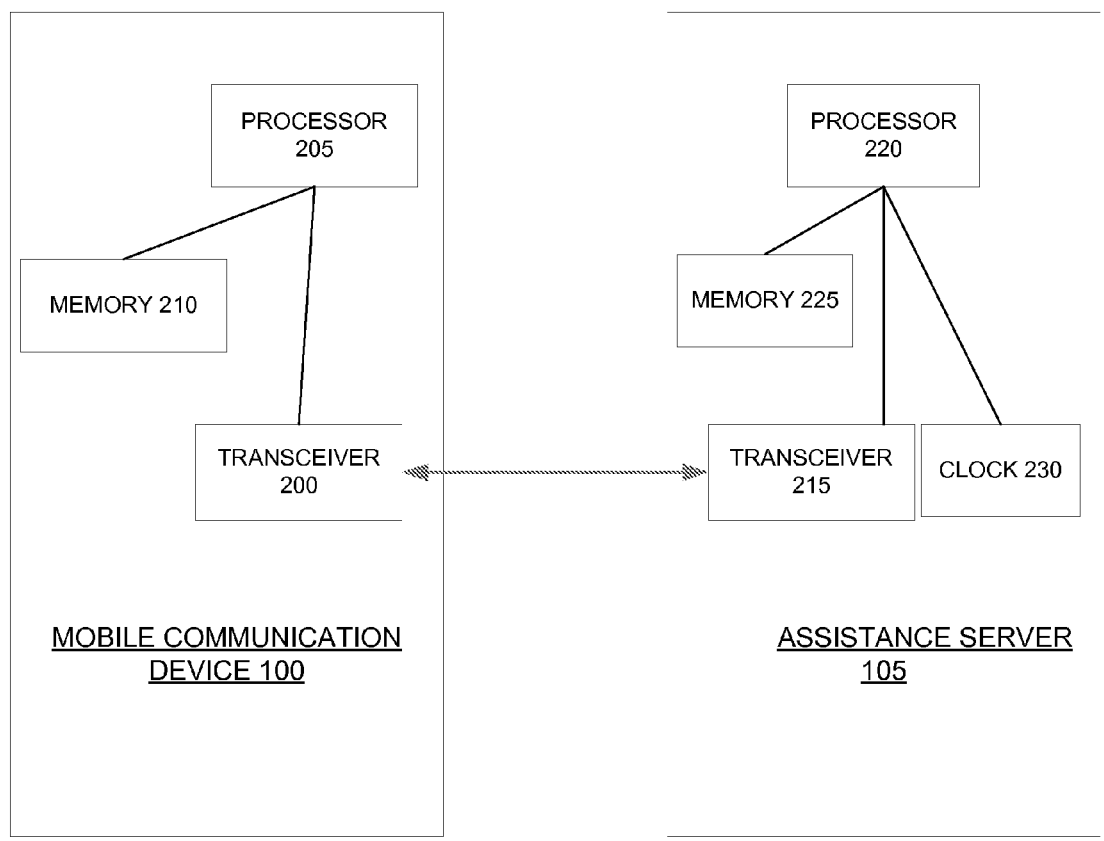
FIG. 2 illustrates a mobile communication device and an assistance server in accordance with one or more aspects.

FIG. 2 illustrates a mobile communication device and an assistance server in accordance with one or more aspects. A mobile communication device may comprise mobile communication device 100 (as shown in FIG. 1) and an assistance server may comprise assistance server 105 (as shown in FIG. 1). Mobile communication device 100 may have a transceiver 200 which may transmit information to and receive information from the assistance server 105. Mobile communication device 100 may also include a processor 205 and memory 210 for storage and processing of the information to be sent or received such as request information or assistance data. Additionally, memory 100 of the mobile communication device 100 may store computer-readable instructions for performing any or all of the method steps described herein. Assistance server 105 may include a transmission device 215 for transmitting and receiving information from the mobile communication device 100, satellites, and/or other assistance servers (as shown in FIG. 1). Assistance server 105 may also include a processor 220 and a memory 225, where the memory 225 may store a database for storage of request data among other information. For example, the database may store the mobile communication device corresponding to the request, various data related to communication with the mobile communication device, various data related to the request including the various data types requested and the different parameters requested. Additionally, memory 225 of the assistance server 105 may store computer-readable instructions for performing any or all of the method steps described herein. The assistance server may also include one or more clocks 230 which may be initialized or re-set upon command by, for example, the processor 220. Alternatively, the clocks 230 may be implemented in software under the control of the processor 220.

Figure 3:
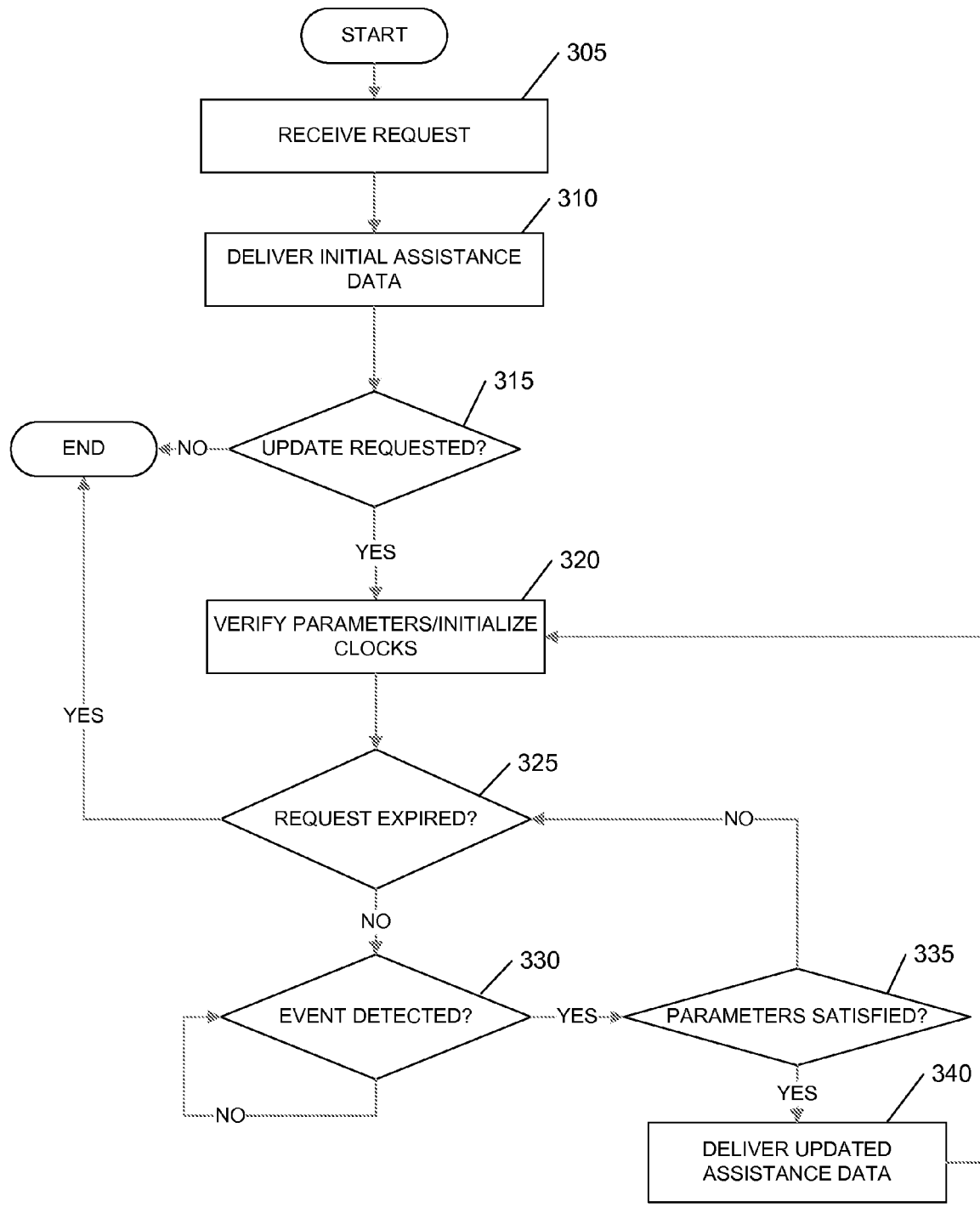
FIG. 3 illustrates a flow chart of an assistance data delivery process for a requested data delivery type in accordance with one or more aspects discussed herein.

FIG. 3 illustrates a flow chart of an assistance data delivery process for a requested data delivery type in accordance with one or more aspects discussed herein. At step 305, a server (e.g., assistance server 105 of FIG. 1) may receive a request from a mobile communication device (e.g., mobile communication device 100 of FIG. 1) for initial delivery of assistance data related to one or more assistance data type. For GPS, available assistance data types may include almanac data (which may be data related to low-detail, long-term model of satellite orbits and clocks), ionospheric model data (which may be data related to modeling of the propagation delay on satellite signals cause by the ionosphere), and navigation model data (which may be data related to the modeling of the orbit of the satellite over time). Other examples may include acquisition assistance data, differential GPS corrections data, real time integrity data, and the like. Other GNSS may employ similar and/or different data types.

At step 310, the server may respond to a request by a mobile communication device and may deliver assistance data in accordance with the request. Alternatively, in the request it may be indicated that the first set of assistance data will be delivered when updated data becomes available, or after a requested time period has elapsed or after one or more additional parameters has been satisfied. At step 315, the server may determine if updates were also requested for each data type. For example, the server may verify if an update request parameter was included in the request for each data type. If the server determines that the request fails to include an update request parameter and/or includes a parameter affirmatively declining updates (e.g., a "UPDATE=FALSE" parameter), the assistance data delivery process may be complete.

If the request includes an update request parameter, the server may determine if additional update parameters were included in the request at step 320. Additional update parameters may define conditions or criteria related to timing, frequency, or other conditions that the mobile communication device desires in relationship to the delivery of updated assistance data. Update parameters may include a minimum update period parameter, a maximum update period parameter, a request validity period parameter, and the like. For example, if the request includes a minimum update period parameter of 120 seconds, and updated assistance data becomes available, the server might not send the updated assistance data until the minimum 120-second update period has expired. On the other hand, a maximum update period parameter may prompt the server to send assistance data even if no updates are available once the maximum update period parameter is satisfied.

Such update parameters related to timing (e.g., timing parameters) may prompt the server to utilize a counter or timer to assist the server in complying with the timing parameter. The server may utilize one clock for each timing period related to each data type. As such, the server may utilize a plurality of clocks with respect to a request from one mobile communication device, and may utilize a plurality of clocks with respect to a request from a second mobile communication device.

In another example of update parameters, a requested validity period parameter of 86400 seconds may prompt the server to set a clock or timer to determine when the request may expire (e.g., after the timer reaches 86400 seconds). The server may initialize or re-set a counter or timer for each timing parameter, also at step 320. If a requested validity period parameter is included in the request, at step 325, the server may determine if a request validity period has expired. If the request has expired, the process may end. If the request fails to specify a request validity period for a data type or if the parameter is set to infinity, then the assistance data delivery process may be intended to run indefinitely or until a new request is received by the server.

At step 330, the server may determine if an event has triggered delivery of assistance data to the mobile communication device. An event may be any occurrence which prompts the server to send assistance data to the mobile communication device. Examples of events that may trigger the delivery of updated assistance data may include the server receiving updated assistance data and the server detecting that updated assistance data may be available. Additionally, the detection of a maximum update period parameter may be considered an event as well as the server may send assistance data in response to such detection. An event may be external to the server (e.g., availability of updated assistance data) or may be internal to the server (e.g., reaching the maximum update period as requested by the mobile communication device). In one aspect, events may be defined by the requesting mobile communication device as part of the assistance data request. In another aspect, events may be pre-defined by the server.

The universe of events which may trigger delivery of assistance data to one mobile communication device may be different than the universe of events which may trigger delivery to a second mobile communication device (e.g., a request from one mobile communication device may include a list of event parameters, while a request from another mobile communication device may fail to include a list of event parameters, but instead includes only a maximum update period).

Upon determining that an event has occurred, the server may verify that all parameters are satisfied at step 335 before sending the updated assistance data to the mobile communication device at step 340. After the server sends the mobile communication device the updated assistance data at step 340, the process may return to step 320. At any point in assistance data delivery process, the mobile communication device may send a new request. A new request may halt execution of the previous request at the server and the server may begin satisfying the new request.

In one aspect, the server may store default parameters for utilization when certain criteria is met. For example, if update parameters were not included in a request for assistance data of a particular data type, the server may apply default parameters stored in a database. Default parameters may include a request validity parameter set at, for example, 2 hours or 7200 seconds.

Figure 4:
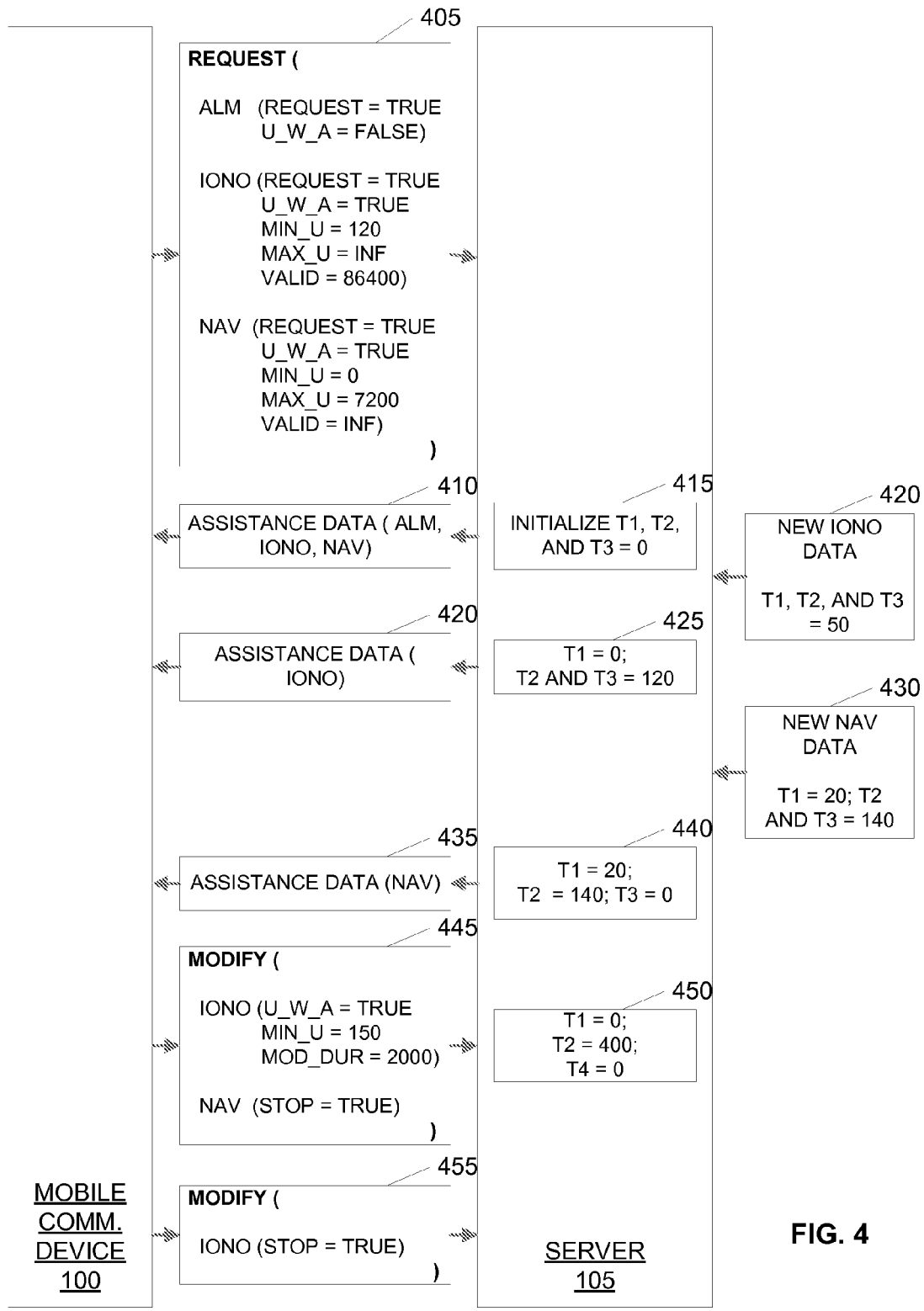
FIG. 4 illustrates an example of information flow between a mobile communication device and an assistance server.

FIG. 4 illustrates an example of information flow between a mobile communication device and an assistance server. In one aspect, the information flow may begin with a data request 405 transmitted by a mobile communication device to the assistance server. The assistance data request 405 may include requests for one or more assistance data types, and for each assistance data type requested, additional parameters may be passed with respect to the data type requested. In one aspect, data types and parameters with respect to each data type may be requested as desired by the mobile communication device. In another aspect, data types and parameters may be adjusted (e.g., adding, subtracting, or modifying) by the server.

For example, assistance data request 405 may include a request for data types, almanac data, ionospheric model data and navigation model data among other data types. For each of the data types requested, a set of parameters may be included in the request. For example, with respect to almanac data, one parameter may be included to formally request almanac data (e.g., "REQUEST=TRUE" parameter), a second parameter may be included to indicate that no updates should be given ("U_W_A=FALSE" parameter, where U_W_A may be described as "update when available").

With respect to ionospheric model data, the mobile communication device may desire to have continued updates, and as such, may include parameters indicating that updates should be given ("U_W_A=TRUE" parameter) and may further include parameters related to the frequency or timing of the updates requested. For example, a minimum update period parameter (e.g., MIN_U) may indicate a desired minimum period for updates, e.g., 120 seconds. As such, consecutive updates might not be sent from the assistance server to the mobile communication device until the passage of at least 120 seconds. Similarly, a maximum update period for ionospheric data (e.g., MAX_U) may be requested by the mobile communication device. As an example, the mobile communication device may request that there be no maximum update period and may set this parameter as infinity (e.g., INF). The duration for the validity of the request for ionospheric model data may also be included as a parameter as part of the request (e.g., VALID=86400 seconds).

The assistance data request may also include a request for navigation model data or ephemeris. As shown in FIG. 4, the parameter categories for the navigation model data may similar to the ionospheric model data parameter categories, but the values for each of the parameters may be different. For example, the MIN_U parameter may be set to "0" seconds indicating that updated assistance data may be sent immediately without concern as to when the previous update was sent. The MAX_U may be set to "7200" indicating that assistance data may be sent at least once every 7200 seconds. The duration for the validity of the request for navigation model data may be set to "INF" indicating that the request may continue indefinitely. In other examples, the parameter sets of the data parameter categories may be different.

After the server receives the request, the server may process the request. The server may deliver the assistance data 410 with respect to the almanac, ionospheric model and navigation model data types in accordance with the respective "REQUEST=TRUE" parameters. With respect to the almanac data request, the server might not deliver any updates as the request indicated that no updates are necessary. With respect to the ionospheric model data request, the server may set two clocks (e.g, T1 and T2) as shown in block 415. One clock or timer (T1) may be utilized to track the minimum update period. The server may send updated assistance data related to the ionospheric data to the mobile communication device provided that the updated assistance data is sent at least 120 apart from the previous delivery of assistance data. In one aspect, the updated data might not be sent by the server until the clock reaches 120 seconds. Upon delivery of the updated ionospheric data, the clock may be reset by the server. The server may continue to provide updated ionospheric data until the second timer (T2) reaches 86400, indicating that the request has expired.

With respect to the navigation model data request, the server may initialize one clock (T3, also shown in block 415) with respect to the "MAX_U=7200 seconds" parameter. Updated assistance data related to the navigation model may be delivered immediately as the "MIN_U" has been set to 0 seconds. Each time updated assistance data is delivered, the clock corresponding to the "MAX_U" parameter may be reset. If the clock reaches the 7200 seconds, the current assistance data may be delivered to the mobile communication device even if the current assistance data may have been delivered 7200 seconds ago, and the clock may be reset.

As shown in block 420, updated ionospheric data may be received by server 105, for example, 50 seconds after the clocks were initialized at block 415. Here, the three clocks T1, T2 and T3 may all read 50. While the updated ionospheric data may be available, the request from mobile communication device 100 included parameter, "MIN_U=120". As such, the updated ionospheric data might not be delivered to mobile communication device 100 until the parameter is satisfied (i.e., until T1 reaches 120 seconds). When T1 reaches 120, the updated ionospheric data may be delivered to the mobile communication device, as shown in block 420. Block 425 illustrates the status of the three timers, respectively, after 120 seconds. At this point, T1 may be reset to 0 as updated ionospheric data may have been delivered to the mobile communication device by the server.

As shown in block 430, updated navigation model data may be received by server 105, for example, 20 seconds after the ionospheric model data was delivered and T1 was reset. Here, T1 may read 20 seconds, while both T2 and T3 may read 140 seconds. As shown in block 435, the updated navigation model data may be immediately delivered as the "MIN_U" parameter for this data type was requested to be 0. Block 440 illustrates the state of T1, T2, and T3, respectively at the time of the delivery of the updated navigation model data where T3 may have been reset due to the delivery of the updated navigation model data.

The mobile communication device may submit a new or updated request as shown in block 445. Such a request may halt any processing of a previous request. In one configuration, if the new request 420 fails to offer a new value for an existing parameter, the server may process the new request along with the existing parameter. For example, if a first request defines a "MIN_U" parameter and a "VALID" parameter, and a subsequent request only defines a new "VALID" parameter, the server may process the new request with the "MIN_U" parameter value of the previous request. Additionally, the new request 420 may include a "MOD_DUR" parameter (where the "MOD_DUR" parameter may represent a modification expiration value) indicating to the server that a new clock may need be utilized to track the "MOD_DUR" parameter. When the clock reaches the "MOD_DUR" parameter value, the request may expire. In one aspect, the server may return to the previous request and process the previous request after the clock reaches the value specified in the "MOD_DUR" parameter. In another aspect, a new request may be permanent and might not include "MOD_DUR" parameter.

The modifying request as shown in block 445 may modify a "MIN_U" value, may request a "MOD_DUR" value with respect to the ionospheric data type, and may also request that the server stop delivery of any navigation model data (e.g., "NAV (STOP=TRUE)"). Block 450 illustrates three clocks, T1, which may have been reset due to the modifying request, T2, which may not have been reset and may be at 400 seconds since T2 was first initialized at block 415, and a new clock T4, which may track the "MOD_DUR" value and may be initialized to 0. T3 may be stopped and may further be removed as the modifying request indicated that the server stop delivery of any navigation model data.

The server may stop sending any updated assistance data if a request validity value is satisfied or if the server receives an assistance data stop request as shown at block 455.

In one aspect, the server may service a plurality of mobile communication devices and may group mobile communication devices based on the data types requested and/or the parameters requested. For example, the server may create several groups such that the server may send out updated assistance information to each member of a group concurrently. In another example, groups based on common limit values (e.g., same "MIN_U" value) may reduce the number of counters needed for the assistance data delivery process. In another aspect, groups created by the server may be dynamic depending on data types requested and/or parameters requested by the mobile phones.

Figure 5:
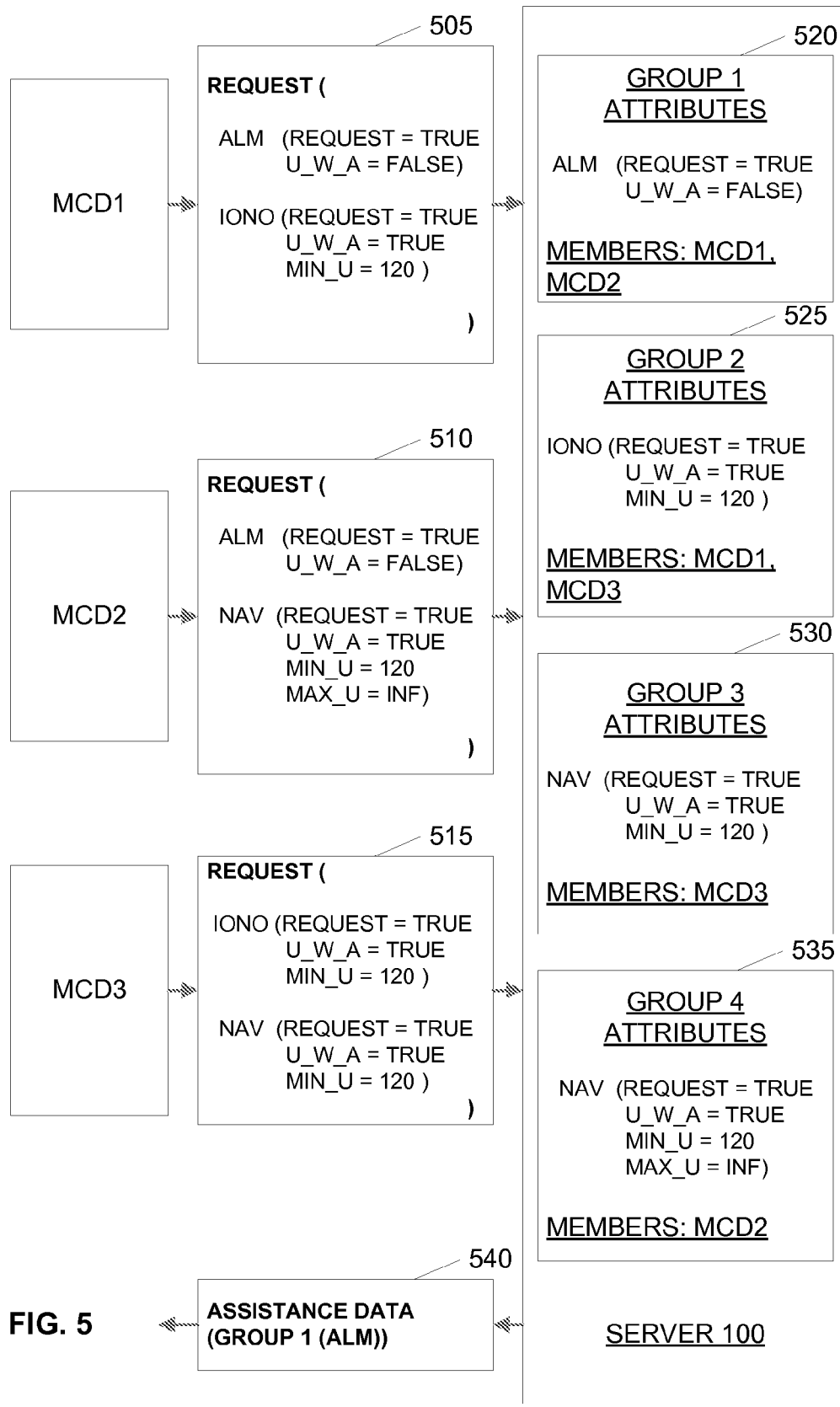
FIG. 5 illustrates an example of a grouping of requests by an application server.

FIG. 5 illustrates an example of a grouping of requests by an application server. Mobile communication devices, MCD1, MCD2 and MCD3, may send requests 505, 510, and 515 to the server 100. The server 100 may process the requests and may create groups 520, 525, 530 and 535 based on one or more attributes. An attribute may be one or more data types and/or one or more parameters. For example, group 1 520 may be based on almanac data type and parameters "REQUEST=TRUE" and "U_W_A=FALSE". Mobile communication devices MCD1 and MCD2 may be members of group 520 as requests 505 and 510, respectively, include the attributes parameters "REQUEST=TRUE" and "U_W_A=FALSE" for an almanac data type. Group 2 525, for example, may be based on an ionospheric model data type and parameters "REQUEST=TRUE", "U_W_A=TRUE", and "MIN_U=120" and may include members MCD1 and MCD3. Group 3 530, for example, may be based on a navigation model data type and parameters "REQUEST=TRUE", "U_W_A=TRUE" and "MIN_U=120" and may include member MCD3. Group 4 535, for example, may be based on a navigation model data type and parameters "REQUEST=TRUE", "U_W_A=TRUE", "MIN_U=120", and "MAX_U=INF" and may include member MCD2.

Server 100 may send out assistance data to the respective groups when the requested data becomes available as shown in block 540.

Aspects described herein are contemplated to be applicable for use by any type of mobile communication device, such as a user navigation device including both stand-alone navigation devices and mobile communication devices with navigation capability. While illustrative embodiments described herein embody various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combinations with the elements of the other embodiments. It will also be appreciated and understood that modification may be made without departing from the true spirit and scope of the present intention. The description is thus to be regarded as illustrative instead of restrictive on the present intention.

We claim:

1. A method comprising:
   receiving, by an assistance server and from a mobile communication device, a request for assistance data of a data type, wherein the request includes a period parameter defining a period in which the assistance server is to transmit information related to the assistance data based on the request and at least one rate parameter defining at least one rate condition on when the assistance server is to send the assistance data during the period;
   during a period in which the assistance server is transmitting the information related to the assistance data based on the request, sending a plurality of transmissions based on the request to the mobile communication device, the plurality of transmissions comprising a first transmission of the assistance data and a second transmission of the assistance data in accordance with the period parameter and the at least one rate parameter;
   receiving, by the assistance server, a modification request for the assistance data of the data type, wherein the modification request includes a modification period parameter for modifying the period in which the assistance server is to transmit information related to the assistance data based on the request to cause the assistance server to transmit information related to the assistance data based on the modification request; and
   during a period in which the assistance server is transmitting the information related to the assistance data based on the modification request, sending one or more transmissions based on the modification request, the one or more transmissions comprising at least a portion of the information related to the assistance data.

2. The method of claim 1, wherein sending of the second transmission of the assistance data is conditioned upon the assistance server receiving updated assistance data, wherein the second transmission of the assistance data includes the updated assistance data.

3. The method of claim 1, further comprising:
   determining that at least one timer set in accordance with the at least one rate parameter has expired;
   wherein sending of the second transmission of the assistance data is responsive to determining that the at least one timer has expired.

4. The method of claim 1, wherein the data type includes almanac data, ionospheric model data, navigation model data, or differential corrections.

5. The method of claim 1, wherein the at least one rate parameter includes a minimum update parameter or a maximum update parameter.

6. The method of claim 1, further comprising:
   receiving, by the assistance server and from a further mobile communication device, a further request for the assistance data of the data type, wherein the further request does not include a parameter defining a period in which the assistance server is to send the assistance data to the further mobile communication device;
   responsive to receiving the further request, applying a default period parameter that defines a default period in which the assistance server is to send the assistance data; and
   sending two or more transmissions of the assistance data to the further mobile communication device during the default period.

7. The method of claim 1, wherein the request is received via a wireless network from the mobile communication device, and wherein the assistance data is sent via the wireless network to the mobile communication device.

8. The method of claim 1 further comprising:
   receiving, from a further mobile communication device, a further request for the assistance data of the data type, wherein the further request includes at least one further rate parameter;

comparing the request and the further request to determine that the request and the further request have the data type in common and have common values for the at least one rate parameter and the at least one further rate parameter;

in response to determining that the request and the further request have the data type in common and have common values for the at least one rate parameter and the at least one further rate parameter, forming a transmission group that includes the mobile communication device and the further mobile communication device; and based on a single timer for the transmission group that is set based on one of the common values for the at least one rate parameter and the at least one further rate parameter, sending updated assistance data to the mobile communication device and the further mobile communication device.

9. The method of claim 1, further comprising:
detecting, by the assistance server, an occurrence of an event, wherein the sending of the second transmission of the assistance data is in response to the detecting.

10. An apparatus comprising:
a processor; and
a memory storing computer readable instructions that, with the processor, cause the apparatus to at least:
receive, from a mobile communication device, a request for assistance data of a data type, wherein the request includes a period parameter defining a period in which the apparatus is to transmit information related to the assistance data based on the request and at least one rate parameter defining at least one rate condition on when the apparatus is to send the assistance data during the period;
during a period in which the apparatus is transmitting the information related to the assistance data based on the request, send a plurality of transmissions based on the request to the mobile communication device, the plurality of transmissions comprising a first transmission of the assistance data and a second transmission of the assistance data in accordance with the period parameter and the at least one rate parameter;
receive a modification request for the assistance data of the data type, wherein the modification request includes a modification period parameter for modifying the period in which the apparatus is to transmit information related to the assistance data based on the request to cause the apparatus to transmit information related to the assistance data based on the modification request; and
during a period in which the apparatus is transmitting the information related to the assistance data based on the modification request, send one or more transmissions based on the modification request, the one or more transmissions comprising at least a portion of the information related to the assistance data.

11. The apparatus of claim 10, wherein causing the apparatus to send the second transmission of the assistance data is conditioned upon the apparatus receiving updated assistance data, wherein the second transmission of the assistance data includes the updated assistance data.

12. The apparatus of claim 10, wherein the computer readable instructions, with the processor, cause the apparatus to:
determine that at least one timer set in accordance with the at least one rate parameter has expired;
wherein the second transmission of the assistance data is caused to be sent by the apparatus responsive to determining that the at least one timer has expired.

13. The apparatus of claim 10, wherein the data type includes almanac data, ionospheric model data, navigation model data, or differential corrections data; and
wherein the at least one rate parameter includes a minimum update parameter or a maximum update parameter.

14. The apparatus of claim 10, wherein the computer readable instructions, with the processor, cause the apparatus to:
receive, from a further mobile communication device, a further request for the assistance data of the data type, wherein the further request does not include a parameter defining a period in which the apparatus is to send the assistance data to the further mobile communication device;
responsive to receiving the further request, applying a default period parameter that defines a default period in which the apparatus is to send the assistance data; and
based on the request, sending two or more transmissions of the assistance data to the further mobile communication device during the default period.

15. The apparatus of claim 10, wherein the request is received via a wireless network from the mobile communication device, and wherein the assistance data is sent via the wireless network to the mobile communication device.

16. The apparatus of claim 10, wherein the computer readable instructions, with the processor, cause the apparatus to:
receive, from a further mobile communication device, a further request for the assistance data of the data type, wherein the further request includes at least one further rate parameter;
compare the request and the further request to determine that the request and the further request have the data type in common and have common values for the at least one rate parameter and the at least one further rate parameter;
in response to determining that the request and the further request have the data type in common and have common values for the at least one rate parameter and the at least one further rate parameter, form a transmission group that includes the mobile communication device and the further mobile communications device; and
based on a single timer for the transmission group that is set based on one of the common values for the at least one rate parameter and the at least one further rate parameter, send updated assistance data to the mobile communication device and the further mobile communication device.

17. A method comprising:
generating, by a mobile communication device, a request for assistance data of a data type, wherein the request includes a period parameter defining a period in which an assistance server is to transmit information related to the assistance data based on the request and at least one rate parameter defining at least one rate condition on when the assistance server is to send the assistance data during the period;
sending, by the mobile communication device, the request;
during a period in which the assistance server is transmitting the information related to the assistance data based on the request, receiving, from the assistance server, a plurality of transmissions based on the request, the plurality of transmissions comprising a first transmission of the assistance data and a second transmission of the assistance data in accordance with the period parameter and the at least one rate parameter;
sending, by the mobile communication device, a modification request for the assistance data of the data type, wherein the modification request includes a modification period parameter for modifying the period in which the assistance server is to transmit information related to the assistance data based on the request to cause the assistance server to transmit information related to the assistance data based on the modification request;

during a period in which the assistance server is transmitting the information related to the assistance data based on the modification request, receiving one or more transmissions based on the modification request, the one or more transmissions comprising at least a portion of the information related to the assistance data.

18. The method of claim 17, wherein the data type includes almanac data, ionospheric model data, navigation model data, or differential corrections data; and wherein the at least one rate parameter includes a minimum update parameter or a maximum update parameter.

19. The method of claim 18, wherein the request is sent via a wireless network from the mobile communication device, and wherein the assistance data is received via the wireless network by the mobile communication device.

20. The method of claim 18, wherein the request is for additional assistance data of an additional data type, wherein the request includes an additional period parameter defining an additional period in which the assistance server is to send the additional assistance data to the mobile communication device and at least one additional rate parameter defining at least one additional rate condition on when the assistance server is to send the additional assistance data during the additional period, and wherein the method further comprises:

based on the request, receiving, from the assistance server, a first transmission of the additional assistance data; and based on the request, receiving, from the assistance server, a second transmission of the additional assistance data in accordance with the additional period parameter and the at least one additional rate parameter.

* * * * *